July 15, 1952     C. P. KRIEGER, JR     2,603,230

LIQUID RETAINING CHECK VALVE

Filed Feb. 9, 1948

INVENTOR

*Conrad P. Krieger Jr.*

BY *Evans & McCoy*

ATTORNEYS

Patented July 15, 1952

2,603,230

UNITED STATES PATENT OFFICE 2,603,230

LIQUID RETAINING CHECK VALVE

Conrad P. Krieger, Jr., Cleveland, Ohio, assignor to The Meriam Instrument Company, Cleveland, Ohio, a corporation of Ohio Application February 9, 1948, Serial No. 7,235

13 Claims. (Cl. 137—202)

This invention relates to liquid retaining check valves adapted to be applied to a chamber containing liquid and gas above the level of the liquid, in which the liquid may be caused to rise and fall by varying pressure, the valve permitting gas to flow in or out of the chamber, but preventing the escape of liquid, and being particularly applicable to manometer tubes.

The invention has for an objection to provide a valve of the character described that is effective to prevent escape of liquid either upon a gradual rise of liquid into the valve, or upon a rapid surge of liquid into the valve due to a sudden change in pressure.

A further object of the invention is to provide a liquid retaining check valve that is equally effective with liquid of high or low specific gravity.

An additional object is to provide a manometer check valve whose operation is not impaired by the action of any of the liquids commonly used in such manometers.

With the above and other objects in view, the invention may be said to comprise the valve as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
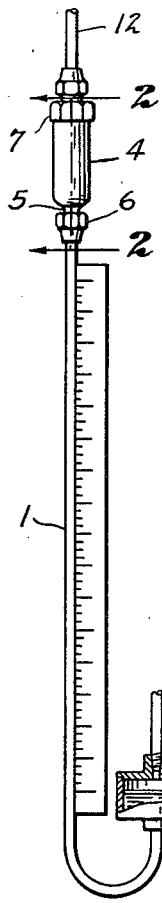
Figure 1 shows the manner in which a valve embodying the invention is applied to a conventional manometer tube.
Figure 2:
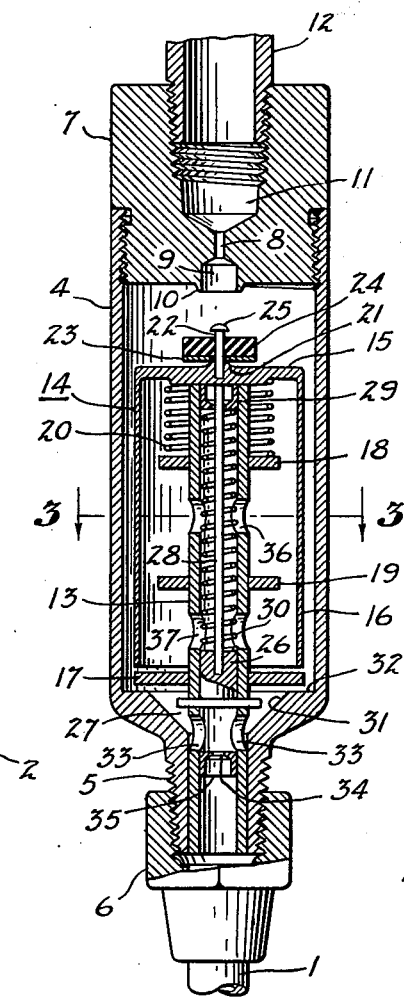
Fig. 2 is a central vertical section through the valve, taken on the line indicated at 2—2 in Fig. 1.
Figure 3:
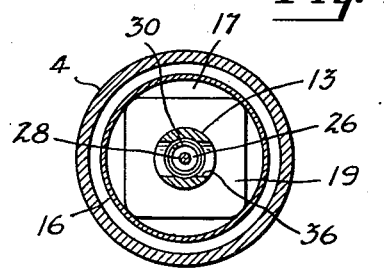
Fig. 3 is a transverse section through the valve taken on the line indicated at 3—3 in Fig. 2.

In the accompanying drawings the valve of the present invention is shown applied to the indicating tube 1 of a manometer of a well known type which receives liquid from a well 2 where the liquid may be subjected to gas under pressure delivered thereto through a pipe 3. The valve of the present invention has a cylindrical housing 4 provided with an externally threaded restricted lower end portion 5 which is connected to the manometer tube 1 by means of a suitable coupling member 6 that receives the upper end of the tube 1 and has threaded connection with the threaded end 5 of the valve housing. The upper end of the housing 4 is closed by a valve head 7 that is secured by suitable means to the upper end of the housing 4. The valve head 7 has a central restricted outlet opening 8 which opens to a counterbore 9 extending to the lower end of the head. The under side of the head is provided with a raised valve seat 10 surrounding the counterbore 9. The opening 8 communicates with a counterbore 11 opening to the top of the valve head which is adapted to receive a pipe 12.

Liquid in the well 2 may be subjected to pressure above atmospheric while the liquid in the tube 1 is subjected to atmospheric pressure, or the liquid in the tube 1 may be subjected to a sub-atmospheric pressure while the liquid in the well 2 is subjected to atmospheric pressure. Also, the liquid of the manometer may be subjected to differential pressures applied through a gas in the pipes 3 and 12 to the liquid in the well 2 and tube 1.

The valve of the present invention is designed to allow free ingress or egress of gas and prevent the escape of liquid through the valve housing 4 under any of the conditions of operation above mentioned.

Within the housing 4 there is a stand pipe 13 that has a press fit at its lower end in the restricted lower portion 5 of the housing. The stand pipe 13 extends into the upper portion of the valve chamber and provides support for a bell type float 14 that has a flat top closure portion 15 that is adapted to rest upon the upper end of the pipe 13. The float 14 has a cylindrical skirt 16 extending downwardly to near the lower end of the valve chamber when the float is resting upon the upper end of the pipe 13. Adjacent the lower end of the valve chamber the stand pipe 13 carries a baffle plate 17 in the form of a circular disk of substantially the same diameter as the skirt 16, the disk 17 being spaced a short distance below the lower end of the skirt 16 when the float is supported on the pipe 13.

Guide disks 18 and 19 which also serve as baffles are secured to the stand pipe 13 at spaced points above the baffle 17. The baffles 18 and 19 are of polygonal form and of a size such that the corners thereof provide guides engageable with the interior of the skirt 16 to constrain the float to movement coaxially with the housing 4 and pipe 13. The straight edges of the polygonal baffles provide spaces for the flow of air and liquid within the skirt 16. Between the upper baffle 18 and the top closure 15 of the float there is interposed a coil spring 20 which is preferably of a strength such that it will support almost all of the weight of the float when the float rests upon the top of the stand pipe 13, thereby increasing the buoyant power of the float.

The upper face of the top closure member 15 is provided with a central boss 21 and with a centrally disposed guide pin 22 extending upwardly therefrom, the guide pin having a press fit in an opening formed centrally in the boss. A washer 23 is mounted on the pin 22 above the boss and the washer 23 supports a valve disk 24 of an elastic rubber-like composition which fits snugly on the pin 22. The boss 21 has a rounded upper face and the washer 23 is formed to fit loosely enough on the pin 22 so that it can rock slightly in any direction on the boss 21 to permit the valve disk 24 to accommodate itself to the seat 10. The pin 22 has a head 25 at its upper end which is spaced a short distance above the upper face of the disk 24 and which enters the counterbore 9 when the valve is in closed position. The valve disk 24 is unconfined and free to expand either radially or axially so that it will not be permanently distorted by pressure against the seat and will not become misshapen if caused to swell by the action of the liquid employed in the manometer. Also the mounting of the elastic valve disk on the pin 22 and boss 21 permits the valve disk and washer to rock in any direction that may be necessary to cause the disk to contact uniformly with the seat 10.

Adjacent the lower end of the valve chamber a surge plunger 26 is slidably mounted within the stand pipe 13. The plunger 26 normally seats upon a stop pin 27 extending transversely through the pipe 13 and has a stem 28 that extends upwardly to the top of the stand pipe when the plunger 26 is seated on the pin 27, the upper end of the stem 28 being normally at the level of the upper end of the pipe 13, or slightly below said upper end so as not to interfere with the seating of the bell 14 on the stand pipe. The upper end of the stem 28 is guided by a plug 29 secured in the upper end of the stand pipe 13, and a coil spring surrounding the stem 28 is interposed between the plunger 26 and the guide plug 29, a spring 30 serving to hold the plunger 26 against the pin 27 with a predetermined pressure. The bottom portion of the valve chamber is in the form of a downwardly tapering conical recess 31 opening to the restricted lower end 5, the conical recess 31 being of less diameter at its upper end than the baffle disk 17 so that a flat annular shoulder 32 is provided at the bottom of the valve chamber around the conical portion 31 and beneath the peripheral portion of the baffle 17 and closely adjacent the same.

The stand pipe 13 communicates at its lower end with the manometer tube 1 and has lateral openings 33 into the conical recess 31 of the valve chamber below the plunger 26. Air and liquid may flow into the valve chamber through a restricted orifice 34 in a plug 35 secured in the pipe 13 immediately below the lateral openings 33. In the normal operation of the manometer air flows freely in either direction through the orifice 34, openings 33, the narrow space between the shoulders 32 and the baffle disk 17, upwardly past the disk 17 and skirt 16 to the space above the float 14 and through the opening 8 in the valve head.

Figure 4:
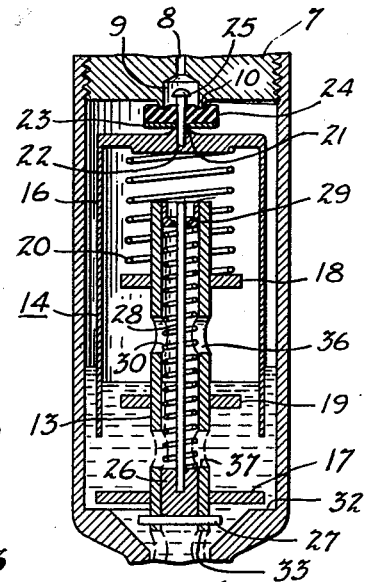
Fig. 4 is a sectional view similar to Fig. 2, but showing the valve closed by float action due to a gradual rise of liquid into the valve chamber.
Figure 5:
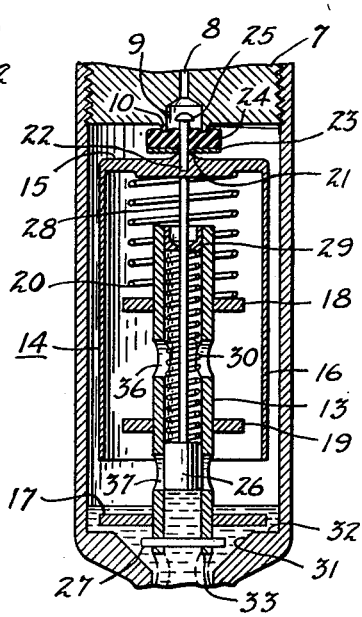
Fig. 5 is a view similar to Fig. 2, showing the action of the valve under a surge of pressure.

If the pressure to which the liquid in the manometer tube 1 is subjected causes the liquid to rise gradually in the valve chamber, the liquid will flow through the orifice 34, openings 33 and around the baffle disk 17 to gradually fill the lower portion of the valve chamber with liquid, closing the lower end of the bell and compressing the air within the bell so as to cause the bell to rise to the position shown in Fig. 4, where the valve disk 24 seals the valve outlet by engagement with the seat 10. The changes in direction of flow of liquid through the openings 33 and past the baffle 17 serve to greatly reduce surging so that the float is effective to prevent escape of liquid except when changes in pressure on the liquid are excessive and sudden. If, however, there is a sudden spurt of liquid into the valve chamber due to an excessive surge of pressure on the liquid, the liquid passing through the restricted orifice 34 will flow in the form of a jet, impinging at high velocity against the bottom of the surge plunger 26, causing the plunger 26 to move upwardly in the stand pipe 13 and lift the bell and valve disk against the seat 10, as shown in Fig. 5 of the drawings, thus effecting an instantaneous closure of the valve outlet, so as to permit sufficient liquid to accumulate in the lower portion of the valve chamber to retain the float in valve closing position.

Above the baffle disk 17 the stand pipe 13 is provided with openings 37 between the baffles 17 and 19. These openings assist in rapid distribution of pressure inside the float, and the lower openings 37 assist in the drainage of liquid from the stand pipe when the valve is reopened.

By supporting substantially all of the weight of the bell upon the spring 20 in the lowermost position of the bell, the buoyancy of the bell is greatly increased and the float responds readily to rise of liquid within the valve chamber regardless of the specific gravity of the liquid.

The spring 30 is designed to hold the plunger 26 against movement until subjected to a predetermined surge pressure which except for the action of the plunger 26 would cause escape of liquid past the float valve. Surges exerting such pressures may be due either to pressure applied to the liquid in the well 2, or to vacuum applied to the liquid through the tube 12.

The valve parts are all made of corrosion resistant material, preferably stainless steel. If desired, the stand pipe may be made of a fibrous composition but it is preferred that the baffle plates 18 and 19 be formed of metal to reduce the friction between the baffles and the skirt of the float.

It is to be understood that variations and modifications of the specific devices herein shown and described for purposes of illustration, may be made without departing from the spirit of the invention.

What I claim is:

1. A liquid retaining check valve having a chamber closed except for an outlet and a restricted inlet orifice open at all times to the interior of the chamber below said outlet through which liquid may flow into the chamber or drain from the chamber, a valve for closing said outlet, a float in said chamber operatively connected to said valve and movable to close the same by liquid accumulating in said chamber, and a valve actuating member in said chamber and operatively connected to said valve, said member being positioned in the path of liquid surging in the form of a jet through said orifice into said chamber and being movable by jet pressure in a direction to close said valve.

2. A liquid retaining check valve having a chamber closed except for an air outlet and a restricted liquid inlet and drain orifice below said outlet, a valve for closing said outlet, a float in said chamber operatively connected to said valve and movable to close the same by liquid accumulating in said chamber, a movable member operatively connected to said valve and positioned to be operated by liquid surging in the form of a jet through said orifice into said chamber in a direction to close said valve, and a spring acting upon said movable member to hold the same against movement by surge pressures below a predetermined pressure.

3. A liquid retaining check valve having a chamber closed except for an air outlet at the top thereof and a restricted liquid inlet and drain orifice in its bottom open at all times to the interior of the chamber, a valve for closing said outlet, a float in said chamber operably connected to said valve and movable upwardly to valve closing position upon an accumulation of liquid in said valve chamber, and a vertically movable member held by gravity in a position spaced from and directly over said inlet orifice to receive the impact of liquid surging in the form of a jet through said opening and operably connected to said valve to close the same when moved upwardly by a surge of liquid through said orifice.

4. A liquid retaining check valve having a chamber closed except for an air outlet adjacent its top and a restricted liquid inlet and drain orifice adjacent its bottom open at all times to the interior of the chamber, a valve for closing said outlet, a float in said chamber operatively connected to said valve and movable to valve closing position by liquid accumulating in the valve chamber, and a movable surge operated member positioned adjacent to but spaced from said orifice in the path of liquid surging in the form of a jet through said orifice into said chamber and movable away from said orifice by jet impact, said member being operatively connected to said float for moving the same to valve closing position.

5. A liquid retaining check valve having a chamber closed except for an air outlet adjacent its top and a restricted liquid inlet and drain orifice adjacent its bottom, a valve for closing said outlet, a float in said chamber operatively connected to said valve and movable to valve closing position by liquid accumulating in the valve chamber, a surge operated member positioned adjacent but spaced from said orifice in the path of liquid surging in the form of a jet through said orifice into said chamber and movable away from said orifice by jet impact, said member being operatively connected to said float for moving the same to valve closing position, and a spring acting upon said surge operated member to hold the same against movement by surge pressures below a predetermined pressure.

6. A liquid retaining check valve having a chamber provided with an outlet at the top thereof and an upwardly directed restricted inlet orifice at its bottom open at all times to the interior of the chamber, a float guided for vertical movement in said chamber, a valve carried by said float for closing said outlet, a plunger mounted for vertical movement above said orifice and having a part engageable with said float to move the same upwardly to valve closing position, and means for supporting said plunger from and directly over said orifice to receive the impact of liquid surging through said orifice.

7. A liquid retaining check valve having a chamber provided with an outlet at the top thereof and an upwardly directed restricted inlet orifice at its bottom, a float guided for vertical movement in said chamber, a valve carried by said float for closing said outlet, a plunger mounted for vertical movement above said orifice and having a part engageable with said float to move the same, means for supporting said plunger directly over said orifice to receive the impact of liquid surging through said orifice, and a spring exerting a downward pressure on said plunger.

8. A liquid retaining check valve having a chamber closed except for an outlet adjacent its top and a restricted inlet orifice below said outlet that is open at all times to the interior of the chamber, a valve for closing said outlet, a vertically movable float in said chamber operably connected to said valve, a spring exerting an upward pressure on said float to increase its buoyancy, a member positioned adjacent to and spaced from said orifice and movable away from said orifice under the impact of liquid surging in the form of a jet through said orifice, and means operably connecting said member to said float to move the same to valve closing position upon actuation of said member.

9. A liquid retaining check valve comprising a chamber having an outlet at the top thereof and an opening in the bottom thereof, a stand pipe fitting in said opening and having a lateral opening to the chamber adjacent the bottom, a restricted inlet passage in said stand pipe immediately below said openings, a float in the form of an inverted bell supported on said stand pipe, a valve member carried by said bell for closing said outlet, means carried by said stand pipe for guiding said float, a vertically movable plunger in said stand pipe, means for supporting said plunger directly over said orifice and above said lateral openings, and a stem carried by the plunger and engageable with said bell upon upward movement of the plunger.

10. A liquid retaining check valve comprising a chamber having an outlet at the top thereof and an opening in the bottom thereof, a stand pipe fitting in said opening and having a lateral opening to the chamber adjacent the bottom, a restricted inlet passage in said stand pipe immediately below said openings, a float in the form of an inverted bell supported on said stand pipe, a valve member carried by said bell for closing said outlet, means carried by said stand pipe for guiding said float, a vertically movable plunger in said stand pipe, means for supporting said plunger directly over said orifice and above said lateral openings, a stem carried by the plunger and engageable with said bell upon upward movement of the plunger, and a spring exerting a downward pressure on said plunger.

11. A liquid retaining check valve comprising a chamber having an outlet at the top thereof and an opening in the bottom thereof, a stand pipe fitting in said opening and having a lateral opening to the chamber adjacent the bottom, a restricted inlet passage in said stand pipe immediately below said openings, a float in the form of an inverted bell supported on said stand pipe, a valve member carried by said bell for closing said outlet, polygonal disks secured to said stand pipe and interiorly engaging the float to guide the same and to provide baffles within the bell, a baffle disk secured to said pipe above said lateral openings and underlying said float, a vertically movable plunger in said stand pipe, means for limiting the downward movement of said plunger and normally supporting the same adjacent said orifice, and a stem attached to said plunger and engageable with said float to impart upward movement to said float.

12. A liquid retaining check valve comprising a chamber having an outlet at the top thereof and an opening in the bottom thereof, a stand pipe fitting in said opening and having a lateral opening to the chamber adjacent the bottom, a restricted inlet passage in said stand pipe immediately below said openings, a float in the form of an inverted bell supported on said stand pipe, a valve member carried by said bell for closing said outlet, polygonal disks secured to said stand pipe and interiorly engaging the float to guide the same and to provide baffles within the bell, a baffle disk secured to said pipe above said lateral openings and underlying said float, a spring interposed between the upper of said disks and said float for partially supporting said float, a vertically movable plunger in said stand pipe, means for limiting the downward movement of said plunger and normally supporting the same adjacent said orifice, and a stem attached to said plunger and engageable with said float to impart upward movement to said float.

13. In a liquid retaining check valve a valve chamber having an outlet in the top wall thereof, an annular seal surrounding the outlet on the interior of said top wall, a float in the form of an inverted bell, means for guiding said float, a boss on the top of said float provided with a rounded top, a pin projecting vertically from said boss centrally thereof, a washer loosely mounted on said pin, and a valve disk of elastic material snugly fitting on said pin and resting on said washer, said disk being unconfined to expand radially or axially and said washer and valve disk being rockable on said seat to enable said disk to accommodate itself to said valve seat.

CONRAD P. KRIEGER, Jr.

REFERENCES CITED

The following references are of record in the file of this patent:

UNITED STATES PATENTS

| Number | Name | Date |
| --- | --- | --- |
| 338,196 | Smith | Mar. 16, 1886 |
| 2,086,637 | Price | July 13, 1937 |
| 2,209,473 | Price | July 30, 1940 |
| 2,252,164 | Cantor | Aug. 12, 1941 |
| 2,325,956 | Holtman | Aug. 3, 1943 |